United States Patent [19]

Alphonse et al.

[11] 4,153,894
[45] May 8, 1979

[54] RANDOM PHASE DIFFUSER FOR REFLECTIVE IMAGING

[75] Inventors: Gerard A. Alphonse; David H. R. Vilkomerson, both of Princeton; Bernard Hurley, Collingswood, all of N.J.

[73] Assignee: United States of America as represented by the Secretary of the Department of Health, Education, and Welfare, Washington, D.C.

[21] Appl. No.: 823,186

[22] Filed: Aug. 9, 1977

[51] Int. Cl.² .............................................. G01S 9/66
[52] U.S. Cl. .............................. 340/1 R; 340/5 MP; 340/8 MM; 310/334; 73/644; 181/175
[58] Field of Search ............... 310/334, 335, 336, 337; 340/1 R, 5 MP, 5 H, 8 MM; 181/175, 176, 196, 197, 198

[56] References Cited

U.S. PATENT DOCUMENTS

| 3,383,631 | 5/1968 | Korpel | 310/334 |
| 3,419,322 | 12/1968 | Adler | 350/161 |
| 3,461,420 | 8/1969 | Silverman | 340/1 R |
| 3,795,801 | 3/1974 | Broussaud | 340/5 H X |
| 3,953,822 | 4/1976 | Vilkomerson | 340/1 R |

Primary Examiner—Richard A. Farley
Attorney, Agent, or Firm—Holman & Stern

[57] ABSTRACT

Disclosed is a random phase diffuser which is inserted between a transducer and an insonification subject in accoustical imaging. The diffuser is comprised of an array of lossless elements which cause sound emitted by the transducer to be passed through and emitted with a phase value of 0° or 180°. Additionally disclosed is the combination of a random phase diffuser with a wedge coupling feature for increasing insonification efficiency.

6 Claims, 4 Drawing Figures

RANDOM PHASE DIFFUSER FOR REFLECTIVE IMAGING

BACKGROUND OF THE INVENTION

The random phase diffuser relates to imaging systems in general, and ultrasonic imaging in particular.

In reflecting imaging systems generally, the reflected waves of an image must return to the observing aperture [be it a camera or the human eye]. In optical systems there generally is enough roughness on the surface of the illuminating light source to scatter the light over a broad angular cone. The surface variations are comparable to the wave length of light and, thus, scatter the light rather effectively. Therefore, reflected waves in an optical system can be collected even if the observed surface is not perpendicular to the impinging light.

Unfortunately however, surfaces to be observed in accoustical imaging are quite smooth in terms of the wave length of sound used [around 1 mm]. These surfaces act like mirrors such that the angle of incidence of a sound wave is equal to the angle of reflection. If the surface is not insonified [illuminated accoustically] perpendicular to the collecting aperture, the reflected waves will not return to the aperture. Therefore, to successfully image by reflection, diffuse insonification must be used. Generally, the insonification pattern is used that the subject surface appears to be covered with point reflectors, each of which is radiating into a large angle. In the event the surface is not perpendicular to the insonification radiation, waves from these point reflectors will still return to the aperture as long as the angle of the surface to the radiation is less than the angle through which these points are radiating. With such diffuse insonification, surfaces of complex shape and orientation can be reflectively imaged.

Unfortunately, when diffuse insonification is used with a coherent insonification source, interference is produced. The interference fringes between the point reflectors produce what is known as "speckle," a series of black lines produced by the interference fringes, which overlie the reflected image. One prior art method of eliminating "speckle" from the image is by superposition of a number of uncorrelated patterns [analogous to incoherent light]. The variation caused by the overlaying interference fringes cancel the fringes out and produce a speckleless image. Unfortunately, this requires the handling of numerous patterns, and requires a separate operation for each image produced.

SUMMARY OF THE INVENTION

Therefore, it is an object of the present invention to provide a diffuse insonifier to make reflective imaging possible.

It is a further object of the present invention to provide a diffuse insonifier that can be used with coherent insonification and still allow an image without speckles.

A still further object of the present invention is to provide an apparatus to eliminate the necessity of superposition of a number of uncorrelated patterns in eliminating speckles from reflective imaging.

A still further object of the present invention is to provide a random phase diffuser for producing a speckleless image during reflective imaging.

It is a further object of the present invention to provide a method of reflective imaging with coherent insonification which permits a speckleless reflected image.

The above and other objects are achieved by the insertion of a random phase diffuser between the accoustic transducer and the reflecting subject. The random phase diffuser is comprised of a random array of small accoustically lossless elements, which emit sound independently of other elements, and of a phase value of either 0° or 180°. The diffuser may be coupled to the accoustic transducer by a wedge system for increasing bandwidth and improving impedance matching.

BRIEF DESCRIPTION OF THE DRAWINGS

A more complete appreciation of the invention, and many of the attendent advantages thereof, will be readily apparent by reference to the detailed description when considered in conjunction with the accompanying drawings, wherein.

DETAILED DESCRIPTION OF A PREFERRED EMBODIMENT

Figure 1:
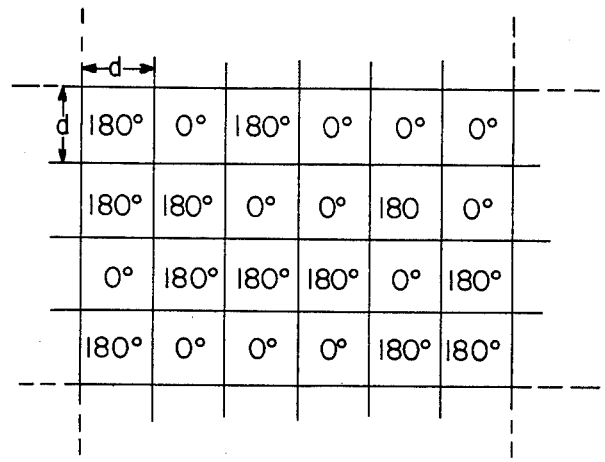
FIG. 1 is a top representational view of the surface of the random phase diffuser.

Referring now more particularly to the drawings, wherein like numerals designate similar parts throughout the several views, and more particularly to FIG. 1, there is shown a random pattern of squares indicating the phase value of either 0° or 180°. It should be noted that such a pattern need not be squares, but could be any random arrangement of elements having different phase emission characteristics. Ideally, each of the squares depicted is a small accoustically lossless element, and the phase of sound emitted by each element is independent of that emitted by any other element. Practically speaking, a random pattern of squares could be generated by any means [for example, a computer program]. The pattern would be photographically reduced to obtain the desired element size [in the FIG. 1 embodiment, a square having a length d on each side] and then printed on the random phase diffuser plate.

The pattern on the diffuser plate would then consist of areas indicating a 0° phase and a 180° phase. The 0° phase squares are then machined to a desired depth [although the 180° squares could be machined instead of the 0° squares]. The significant aspect is that the depth of machining is equal to the required distance necessary to ensure a 180° phase difference between the accoustic sound emitted by the two different types of squares.

With $V_1$, the accoustic speed in the load material [for example, water] and $V_p$, the accoustic speed in the phase plate material, the machining depth H for a 180° phase difference is given as follows:

$$h = \frac{2n - 1}{2f_0 \left( \frac{1}{V_1} - \frac{1}{V_p} \right)},$$

n may be any integer, although the minimum machining depth is given by n=1.

For example, with a water load [$V_1 = 1.5$ km/sec] and a styrene diffuser plate [$V_p = 2.35$ km/sec] with an accoustic frequency $f_o$ of 3 MHz, the minimum machining depth is 0.69 mm.

When a diffuser 10 comprised of N elements is situated between a transducer 12 and a lens 14, the accoustic intensity distribution in the focal [Fourier transform] plane of the lens is N times the intensity distribution of a single element. Thus, if the subject to be imaged is located in the focal plane [a distance F from the lens] the accoustic intensity at any point along the plane will be given by curve 16.

Where, in a preferred embodiment, the diffuser is made up of square elements having a linear dimension d and are insonified by a coherent plane wave front from a transducer, the intensity distribution I [x, y] in the focal plane [x, y] at the focal distance F is given as follows:

$$I(x,y) = Nd^2 \left[ \frac{\sin(\pi xd/\Lambda F)}{(\pi xd/\Lambda F)} \cdot \frac{\sin(\pi yd/\Lambda F)}{(\pi yd/\Lambda F)} \right]^2,$$

where $\Lambda$ is the wavelength of the sound, and the dimension Y is perpendicular to the plane of the drawing. The width W of the distribution in either dimension [x or y, between the first zeros] is given by:

$$W = 2(\Lambda/d) F.$$

Thus, the intensity is proportional to the number of elements, and the width is inversely proportional to the size of an element. Therefore, in the reflective imaging process, this distribution can be used to insonify an object whose dimension is less than W.

It should be noted that the intensity of every illuminated point in the object plane [x, y] has a contribution from every square in the diffuser. Therefore, each point has rays impinging on it over a solid angle of approximately Nd/F, and will therefore reflect a sufficient number of rays back to the transducer as is required for reflective imaging.

Figure 2:
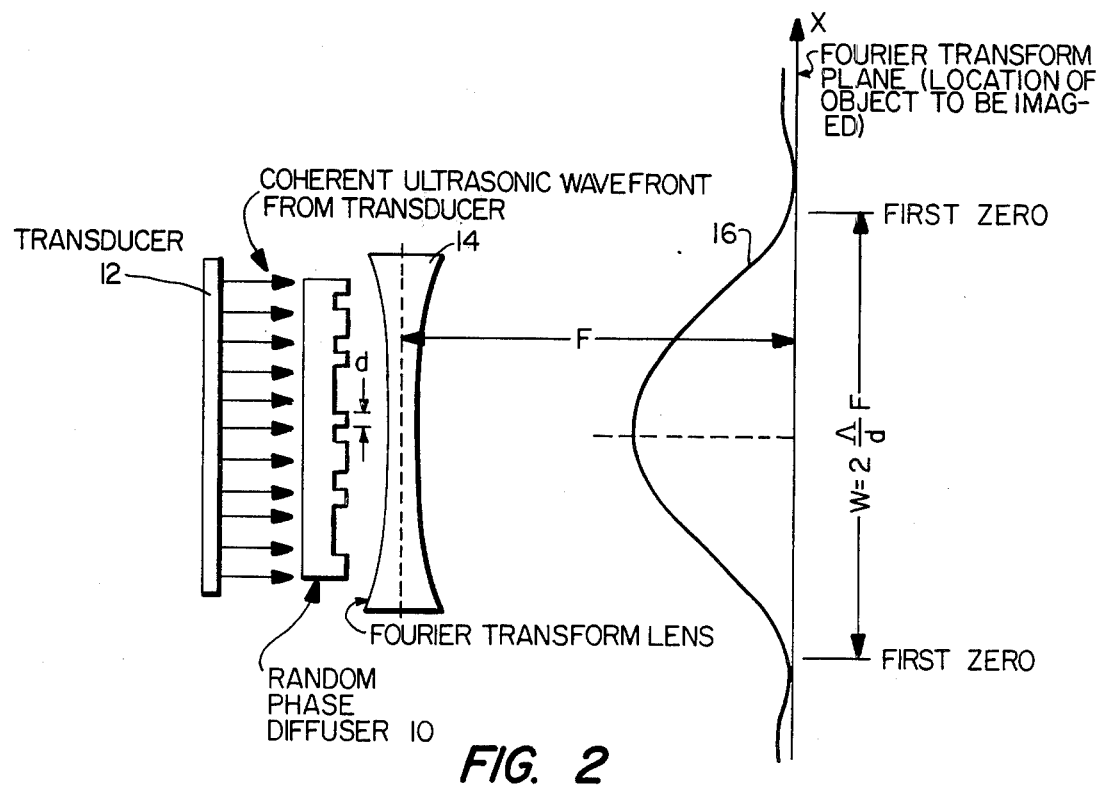
FIG. 2 is a schematic side view showing the location of the random phase diffuser with regard to the transducer supplied wave front and the imaging subject.

The physical implementation of the random phase diffuser in an ultrasonic reflective imaging system is relatively straightforward. The diffuser could be attached directly to the transducer or located in the path of the wave front emitted by the transducer [as shown in FIG. 2]. It should be noted, however, that to obtain optimum efficiency, the impedance of the transducer should match the impedance of the diffuser plate, which should then match the impedance of the medium into which the accoustic waves are being transmitted. As is known in the general art of ultrasonic imaging, a plate having an integral number of half-wavelengths, coupled to the transducer, will have the lowest impedance and appear relatively invisible. However, a coupling plate which has an odd integral number of quarter wavelengths thickness, will appear to the transducer to have a very high relative impedance, and reflect energy back towards the transducer. This reflected energy causes standing waves in the coupling plate which reduce the accoustic amplitude transmitted through the random phase diffuser. With the coupling plate inserted between the random phase diffuser and the transducer itself, the depth difference between the 0° and 180° phase elements would tend to differentiate between the two elements as far as the amplitude of accoustic energy generated. Therefore, the two sets of elements would not transmit accoustic energy with the same amplitude and, thus, the diffuser would not work as well as it could work if the amplitudes were similar.

It is known that a wedge system makes a transducer see an impedance load equal to the material making up the wedge that is in contact with the transducer. Thus, if the wedge material has a characteristic impedance $Z_w$ which is equal to the impedance of the transducer, all of the accoustic energy will be absorbed by the wedge with little or none reflected back to the transducer. The fact that the opposite face of the coupling wedge is at an angle so as to not reflect energy back to the transducer, causes the transducer to not "see" any load attached to the opposite face. Therefore, accoustic energy can be coupled through the opposite face to any load attached thereto without the transducer "seeing" that load. If a second wedge is coupled between the primary wedge and the actual load, it has the effect of reducing the overall insertion loss coupling the transducer to the ultimate load, and yet, is not "seen" by the transducer, eliminating or at least reducing standing waves caused by reflected accoustic energy. The additional advantage of the second auxiliary wedge is that its length [in the direction of accoustic transmission] does not affect the impedance seen by the load or the reflection of energy back to the transducer. The only affect that the extra length may have is to add a slight delay to the accoustic waves. Thus, the machining of the exit face of the second wedge merely affects the delay which is introduced to the accoustic wave exiting therefrom. The variation in exit delay [or phase difference] is exactly what is desired in the random phase diffuser.

Figure 3:
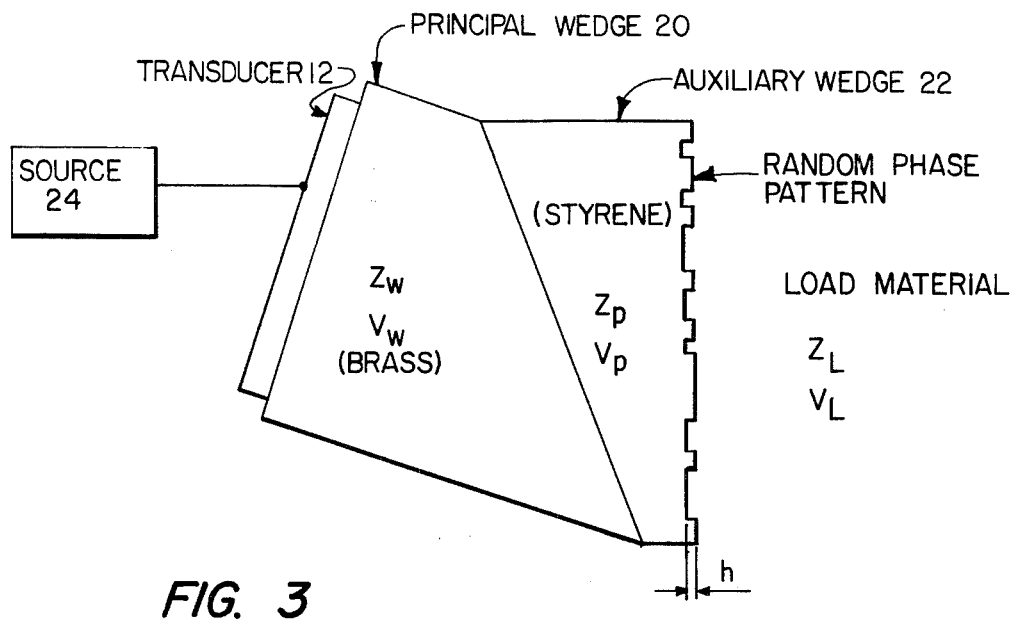
FIG. 3 is a side view showing the orientation of the accoustic transducer, impedance matching wedges and the random phase diffuser.

FIG. 3 shows a preferred embodiment of the random phase diffuser with transducer 12 mounted on a first or principal wedge 20. In a preferred embodiment, brass may be the first wedge material to affect proper impedance matching with transducer 12, which may be a piezoelectric transducer. The second, auxiliary wedge 22 is comprised of a material having a characteristic impedance [$Z_p$] close to that of the load material [$Z_l$] in order to produce the highest accoustic energy transfer therebetween. The random phase pattern shown in FIG. 1 is applied to the exit face of auxiliary wedge 22, and is machined to a depth h, as indicated by the earlier formula. Electrical stimulation from source 24 causes transducer 12 to produce accoustic energy which is directed into wedge 20. As noted earlier, the operation of principal wedge 20 reduces any impedance mismatch between itself and the transducer 12, and prevents the transducer 12 from "seeing" auxiliary wedge 22. Effectively, all of the accoustic energy [with some minor losses excepted] is transmitted into auxiliary wedge 22, through the random phase diffuser pattern on its exit face, and transmitted into the load material. The difference in exit face location [machining depth h] in the random phase plate, causes accoustic energy to be transmitted to the load material with a 180° phase difference. This diffused accoustic energy causes the insonification of the subject, and permits reflective imaging without "speckles" when using coherent insonification.

Figure 4:
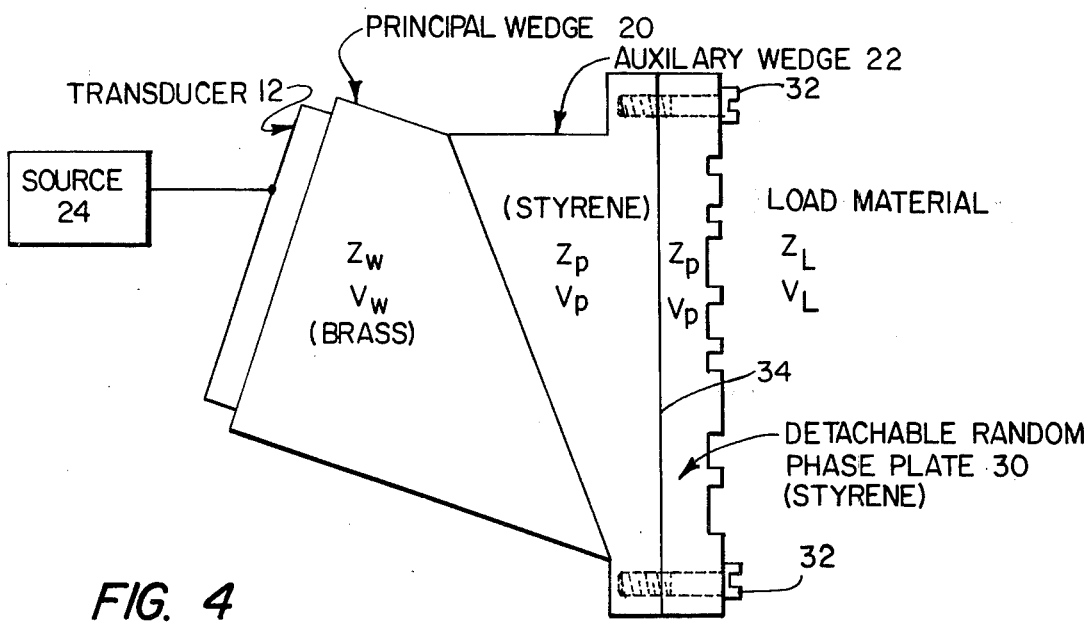
FIG. 4 is a side view of a further embodiment of the random phase diffuser in FIG. 3.

As noted earlier, the width W of the distribution from the random phase diffuser is inversely proportional to the size of an individual element on the diffuser, and the intensity is proportional to the number of elements on the diffuser. Thus, it may be desirable to change the pattern of elements making up the random phase diffuser plate. In FIG. 4, a detachable random phase plate 30 is shown connected to auxiliary wedge 20 by suitable means bonding, bolting, etc. [in this instance, through machine screws 32]. Because the material of the detachable random phase plate 30 [styrene] and the material of the auxiliary wedge 20 [styrene] are the same, their characteristic impedances [$Z_p$] are the same, and thus, there is no energy reflected back from the wedge/plate interface 34. Therefore, effectively all accoustic energy in the auxiliary wedge 20 would be transferred through the random phase plate 30 to the load material itself. However, the use of such a detachable plate permits the size [dimension d], shape [square, rectangular, circular, etc.] or number [N] of diffuser elements to be changed to meet any desired requirement.

It will become clear to those skilled in the art in view of the above teachings, that numerous materials could be utilized to construct a random phase diffuser. Many methods are known to connect the diffuser to the transducer including the aforementioned wedge coupling, half-wave plate coupling, back-loading, etc. Although a preferred embodiment has been disclosed in this specification, the invention is considered limited only the the scope of the claims appended hereto.

What we claim is:

1. In an ultrasonic imaging system including a transducer means for generating accoustic waves and a medium through which said accoustic waves travel, said improvement comprising random means, inserted accoustically between said transducer means and said medium and fixably mounted to said transducer means, for phase-wise diffusing said accoustic waves generated by said transducer means, wherein said random means comprises a plate made up of relatively lossless elements for emitting accoustic energy at varying phase-wise relationships, said phase relationship depending upon the element in the plate, said elements being randomly oriented on said plate.

2. The ultrasonic imaging system of claim 1, wherein said elements are comprised of variations in the thickness of said plate, said thickness varying between thick and thin portions with a thickness difference h between said portions determined by the formula $$h = \frac{2n - 1}{2f_o \left( \frac{1}{V_1} - \frac{1}{V_p} \right)},$$

where n is any integer, $f_o$ is the frequency of accoustic waves generated by the transducer, $V_1$ is the speed of sound in said medium and $V_p$ is the speed of sound in said plate.

3. The ultrasonic imaging system of claim 1, wherein said random means comprises a plate having a pattern of squares on its surface, a first group of squares having the capability of passing accoustic waves of a preset phase relationship to those produced by said transducer means, and a second group of squares for passing accoustic waves having a phase 180° different from the accoustic waves passed by said first group of squares, said squares from said first and second groups being randomly distributed upon the surface of said plate.

4. The ultrasonic imaging system of claim 3, wherein the difference between said first group of squares and said second group of squares is the dimension of said plate in the direction of accoustic wave travel, said difference h in thickness between said first and second groups is determined by the formula $$h = \frac{2n - 1}{2f_o \left( \frac{1}{V_1} - \frac{1}{V_p} \right)},$$

where n is any integer, $f_o$ is the frequency of accoustic waves generated by the transducer, $V_1$ is the speed of sound in said medium and $V_p$ is the speed of sound in said plate.

5. In an ultrasonic imaging system including a transducer means for generating accoustic waves and a medium through which said accoustic waves travel, said improvement comprising random means, inserted accoustically between said transducer means and said medium and fixably mounted to said transducer means, for phase-wise diffusing said accoustic waves generated by said transducer means, wherein said random means comprises:
   a random phase diffusing plate for altering the phase of accoustic energy transmitted to an object; and
   wedge means for coupling accoustic energy from said transducer to said random phase plate and for reducing losses caused by energy reflected back to said transducer.

6. The ultrasonic imaging system of claim 5, wherein said wedge means comprises:
   first wedge means, matching impedance with said transducer, for receiving accoustic energy therefrom; and
   second wedge means, matching impedance with said random phase plate, for coupling energy from said first wedge means to said random phase plate.

* * * * *